US012562142B2

(12) United States Patent
Ellis

(10) Patent No.: US 12,562,142 B2
(45) Date of Patent: Feb. 24, 2026

(54) AUTOHARP KEYBOARD MECHANISM

(71) Applicant: Kenneth K. Ellis, Columbia City, IN (US)

(72) Inventor: Kenneth K. Ellis, Columbia City, IN (US)

( * ) Notice: Subject to any disclaimer, the term of this patent is extended or adjusted under 35 U.S.C. 154(b) by 924 days.

(21) Appl. No.: 17/841,759

(22) Filed: Jun. 16, 2022

(65) Prior Publication Data

US 2022/0406275 A1 Dec. 22, 2022

Related U.S. Application Data

(60) Provisional application No. 63/212,241, filed on Jun. 18, 2021.

(51) Int. Cl.
*G10D 3/09* (2020.01)
*G10D 1/12* (2006.01)

(52) U.S. Cl.
CPC ................. *G10D 3/09* (2020.02); *G10D 1/12* (2013.01)

(58) Field of Classification Search
CPC ................................... G10D 3/09; G10D 1/12
USPC ............................................................ 84/719
See application file for complete search history.

(56) References Cited

U.S. PATENT DOCUMENTS 257,808 A * 5/1882 Zimmermann .......... G10D 3/09 84/287
390,830 A * 10/1888 Wigand .................. G10D 3/09 84/287
521,109 A * 6/1894 Gery et al. ............... G10D 3/09 84/287
534,175 A * 2/1895 Roos ........................ G10D 3/09 84/287
559,764 A * 5/1896 Back ........................ G10D 3/09 84/287
566,388 A * 8/1896 Eschemann .............. G10D 3/09 84/478

(Continued)

FOREIGN PATENT DOCUMENTS

EP 3232433 A1 10/2017
FR 2367328 A1 7/1976

(Continued)

OTHER PUBLICATIONS

Philip Glen Brissenden, The Reverse Action Piano Harp: Innovation and Adaptation from Piano and Autoharp, PhD Thesis 2015.

(Continued)

*Primary Examiner* — Christina M Schreiber

(57) ABSTRACT

The Autoharp Keyboard Mechanism is engaged with an autoharp having strings. Octave bars having piano-like keys are slidingly engaged with pins extending from the top surface of the autoharp and are located above the strings. Damping brackets are also slidingly engaged with the pins and are located beneath the octave bars and beneath the strings. Coil springs are arranged around each of pins and are located beneath the octave bars and the damping brackets. Adjustable length spacers are engaged with the octave bars and with the damping brackets, one at each end of the octave bars and damping brackets. The adjustable length spacers are located between the octave bars and the damping brackets, and are engaged with the octave bars using threads. Holders are configured to retain the octave bars on the pins.

20 Claims, 6 Drawing Sheets

(56) References Cited

U.S. PATENT DOCUMENTS

| | | | | | |
|---|---|---|---|---|---|
| 625,996 | A * | 5/1899 | Young | G10D 1/12 84/288 |
| 634,142 | A * | 10/1899 | Heymann | G10D 3/09 84/322 |
| 753,867 | A * | 3/1904 | Ford | G10D 3/09 84/287 |
| 975,865 | A * | 11/1910 | Holloway | G10D 3/09 84/312 R |
| 1,171,484 | A * | 2/1916 | Van Hoy | G10D 3/09 84/287 |
| 1,282,636 | A * | 10/1918 | Schenuit | G10D 1/12 84/285 |
| 1,668,406 | A * | 5/1928 | Ivanoff | G10C 1/06 984/54 |
| 2,473,442 | A * | 6/1949 | Page | G10D 1/12 84/287 |
| 3,499,357 | A * | 3/1970 | Peterson, Jr. | G10D 3/09 84/723 |
| 3,515,026 | A * | 6/1970 | Rohrbough | G10D 3/09 84/286 |
| 4,175,466 | A * | 11/1979 | Aronis | G10D 1/12 984/109 |
| 4,506,583 | A * | 3/1985 | Newton | G10D 1/12 984/109 |
| 5,078,038 | A * | 1/1992 | Clayton | G10D 3/04 84/288 |
| 7,273,976 | B2 * | 9/2007 | Bennett | G10D 1/12 84/285 |
| 2003/0136248 | A1 * | 7/2003 | Krieger | G10D 1/00 84/735 |
| 2010/0326255 | A1 * | 12/2010 | Bryant | G10D 1/12 84/317 |
| 2022/0406275 | A1 * | 12/2022 | Ellis | G10D 3/09 |

FOREIGN PATENT DOCUMENTS

| | | | | |
|---|---|---|---|---|
| GB | 189809698 | A * | 4/1899 | |
| GB | 190612083 | A | 10/1906 | |
| GB | 2025679 | A * | 1/1980 | G10D 1/12 |
| GB | 2449459 | A * | 11/2008 | G10D 1/12 |
| GB | 2449459 | A1 | 11/2008 | |

OTHER PUBLICATIONS

Songbird Dulcimers, Hammered Dulcimer Dampers, (https://songbirdhd.com), 2022.

* cited by examiner

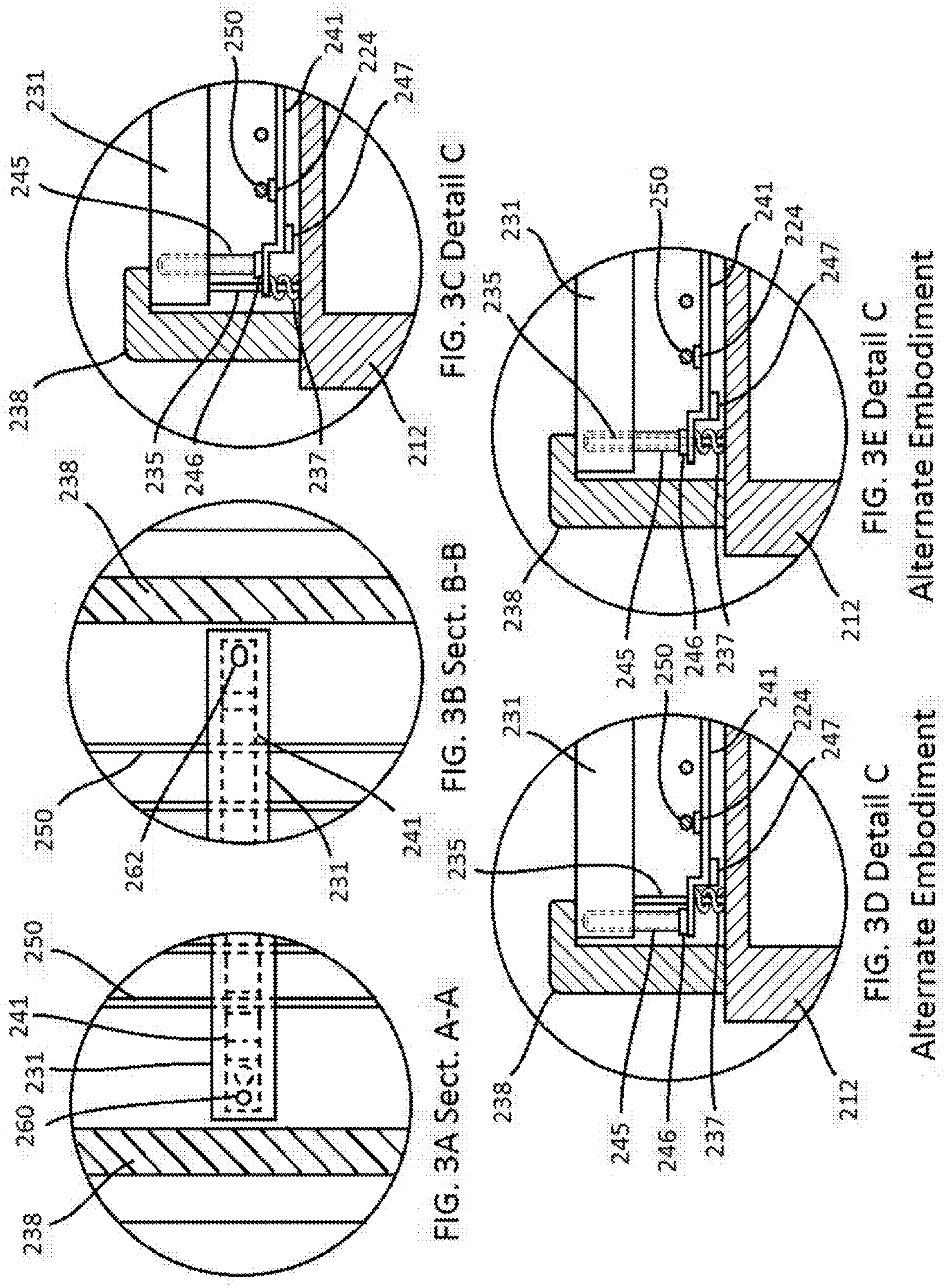
FIG. 3A Sect. A-A
FIG. 3B Sect. B-B
FIG. 3C Detail C
FIG. 3D Detail C
Alternate Embodiment
FIG. 3E Detail C
Alternate Embodiment

AUTOHARP KEYBOARD MECHANISM

CROSS-REFERENCE TO RELATED APPLICATIONS

The present application claims priority to U.S. Provisional Application No. 63/212,241, filed Jun. 18, 2021, the entire contents of which are herein incorporated by reference.

BACKGROUND

Field of Invention

Embodiments of the Autoharp Keyboard Mechanism described herein generally relate to an autoharp string damping mechanism in which the dampers are located under the strings. The Autoharp Keyboard Mechanism is designed to be simple, robust, easily manufactured, and compact.

Related Art

The autoharp consists of a fretless zither with an attached chording mechanism that facilitates playing both chords and melodies. The conventional chording mechanism was first described in the late 19th century by H. J. Haddon's disclosure of K. A. Gütter's invention, Great Britain Patent No. 8,888 (Haddan, 1884). It consists of an assembly of parallel bars mounted perpendicular to the strings that are lined with felt and held above the strings by springs (i.e. "chord bars"). Notches are cut in the felt so that when the bar is engaged some strings are damped by the felt and only those strings tuned to notes of a chord are allowed to ring freely. When no chord bars are engaged, all of the strings are allowed to ring freely. Certain limitations of this type of design are illustrated by several patents, including U.S. Pat. No. 390,830 (Wigand, 1888), U.S. Pat. No. 625,996 (Young, 1899), Great Britain Patent No. 22,417 (Page, 1915), France Patent No. 7,621,691 (Henner, 1976), U.S. Pat. No. 4,175,466 (Aronis, 1979), and U.S. Pat. No. 4,506,583 (Newton, 1985).

For non-limiting example, the length of the shortest string and the width of the chord bars limits the number of chords available to the player, usually to less than 21 chords in order to leave an unobstructed length of string on which to play. One known solution to this problem is to use a mechanism for each bar that damps all the strings tuned to a single note and its octaves. When engaged, the bar releases the strings of a single note and its octaves so that they can ring freely when plucked or strummed. Chords can then be played by engaging several bars at the same time. Certain limited advantages of mechanisms of this type include:

- There are no limits to the number of chords that can be played, other than the number of fingers on the player's hand.
- As there are only twelve notes in the scale, this type of mechanism requires only twelve bars be used, leaving plenty of room to pluck or strum a string.
- If the "buttons" on the bars have the form of piano keys, anybody who knows how to play a piano will be able to play an autoharp so configured with almost no practice.

Such known piano key mechanisms fall into two categories. The first known piano key category consists of mechanisms that raise the dampers off of the strings when pressing down on a key, as shown in Wigand, Young, Page, and Henner. Each of these piano key mechanisms has a distinct disadvantage, for non-limiting example that they require complex linkage systems in order to convert a downward key press into an upward motion of the dampers. This makes them difficult to produce and assemble, which translates into high cost. A complex linkage system as required by the type of mechanism that raises the dampers off of the strings when pressing down on a key also adds weight to the autoharp and mechanical noise to the sound.

The second known piano key category consists of mechanisms in which the dampers are located under the strings, so that the downward motion of a key acts directly to move the dampers down, thereby allowing the strings to ring freely, as shown in Aronis and Newton. Newton's design includes metal brackets that extend from the bar above the strings to below the strings. The portion of the bracket below the string holds the damping material, so that springs that push the bar upwards hold the damping material against the string. There is one bracket on the bar for each string tuned to that note. A non-limiting exemplary disadvantage of Newton's mechanism is that it is difficult to adjust the multiple brackets so that all strings of a note are identically and adequately damped. The brackets of Newton's mechanism are typically made by bending strips of sheet metal, so that small differences in bracket dimensions can result in poor damping for some strings. In addition, string diameters are different so that the brackets may need to drop down below the bars by different amounts. Furthermore, since the brackets are flexible and normally under tension, the brackets need periodic adjustments to maintain effective damping of the strings.

Aronis also teaches a mechanism in which the dampers are located under the strings, as mentioned previously. The Aronis design has piano-like keys for activating the mechanism on the bass-string side of the autoharp body. The damping brackets pivot around adjustable mounting elements on the treble-string side of the autoharp body. As a result, the damping bracket subtends a very small arc about the adjustable mounting element, so that the distance that the damping pad on the treble side travels away from the string nearest the treble side is very small. In order to ensure that the damping pad travels sufficiently far away from the string nearest the treble-string side, the adjustable mounting element must be as far in the direction of the treble-string side as possible. This is so that the strings won't rattle against the damping pads when they vibrate. As a result, this design causes the resulting autoharp to be very wide, and under vigorous use, may still result in the strings rattling against the damping pads.

While it is known to damp autoharp strings from beneath, no method exists for simply and reliably damping autoharp strings from beneath while preserving a compact instrument with good and even damping. Accordingly, there is an unmet need for a simple, robust, easily manufactured and compact autoharp keyboard mechanism.

SUMMARY

Embodiments of the Autoharp Keyboard Mechanism described herein relate to a new design for the class of autoharp mechanisms that implement buttons in the form of piano keys. Embodiments of the Autoharp Keyboard Mechanism described herein further relate to the category of autoharp mechanisms in which the dampers are located under the strings, so that the downward motion of a key acts directly to move the dampers down, thereby allowing the strings to ring freely.

For non-limiting example, an advantage of the Autoharp Keyboard Mechanism design is its simplicity, leading to ease of manufacture and assembly. For further non-limiting example, another advantage of the Autoharp Keyboard Mechanism design is the ability to make fine adjustments using spacers to ensure that the damping brackets apply sufficient and equal force to the damping material for each string, with no periodic adjustments required to maintain good and even damping. Embodiments of the Autoharp Keyboard Mechanism can be used in combination with conventional chord bars to prevent certain strings from ringing until the chord bar above it is engaged, a function normally performed by what are known as "lock bars".

According to one embodiment of the Autoharp Keyboard Mechanism, the Autoharp Keyboard Mechanism is engaged with an autoharp having strings. Octave bars having piano-like keys are slidingly engaged with pins extending from the top surface of the autoharp and are located above the strings. Damping brackets are also slidingly engaged with the pins and are located beneath the octave bars and beneath the strings. Coil springs are arranged around each of pins and are located beneath the octave bars and the damping brackets. Adjustable length spacers are engaged with the octave bars and with the damping brackets, one at each end of the octave bars and damping brackets. The adjustable length spacers are located between the octave bars and the damping brackets.

According to another embodiment of the Autoharp Keyboard Mechanism, a conversion kit is configured to be engaged with an autoharp having strings. Octave bars having piano-like keys are configured to be slidingly engaged with pins that are configured to extend from the top surface of the autoharp. The octave bars are configured to be located above the strings. Damping brackets are configured to slidingly engage with the pins beneath the octave bars and beneath the strings. Coil springs are configured to be arranged around each of the pins beneath the octave bars and damping brackets. Adjustable length spacers are configured to be engaged with the octave bars and with the damping brackets at each end of the octave bars and damping brackets. The adjustable length spacers are further configured to be located between the octave bars and the damping brackets.

According to yet another embodiment of the Autoharp Keyboard Mechanism, a method of manufacturing the Autoharp Keyboard Mechanism Includes several steps. The first step is providing octave bars having piano-like keys. The second step is providing pins extending from the top surface of the autoharp. The third step is slidingly engaging the octave bars with the pins above the strings. The fourth step is slidingly engaging damping brackets with the pins beneath the octave bars and beneath the strings. The fifth step is arranging coil springs around each of the pins beneath the octave bars and damping brackets. The sixth step is engaging adjustable length spacers with the octave bars and with the damping brackets between the octave bars and the damping brackets, the adjustable length spacers being located at each end of the octave bars and damping brackets.

DESCRIPTION OF THE DRAWINGS

The above-mentioned and other features of embodiments of the present Autoharp Keyboard Mechanism, and the manner of their working, will become more apparent and will be better understood by reference to the following description of embodiments of the Autoharp Keyboard Mechanism taken in conjunction with the accompanying drawings, wherein:

FIG. 3A is a partial cross-sectional view of an embodiment of the Autoharp Keyboard Mechanism of the present disclosure, as described herein;

FIG. 3B is a partial cross-sectional view of an embodiment of the Autoharp Keyboard Mechanism of the present disclosure, as described herein;

FIG. 3C is a partial detail view of an embodiment of the Autoharp Keyboard Mechanism of the present disclosure, as described herein;

FIG. 3D is a partial detail view of another embodiment of the Autoharp Keyboard Mechanism of the present disclosure, as described herein;

FIG. 3E is a partial detail view of another embodiment of the Autoharp Keyboard Mechanism of the present disclosure, as described herein;

FIGS. *4a* and *4b* are partial cross-sectional views of known autoharp damping mechanism, as described herein;

FIG. *5a* is a top view of a known autoharp damping mechanism, as described herein; and FIG. *5b* is a top view of an embodiment of the Autoharp Keyboard Mechanism of the present disclosure, as described herein.

Corresponding reference numbers indicate corresponding parts throughout the several views. The exemplifications set out herein illustrate embodiments of the Autoharp Keyboard Mechanism, and such exemplifications are not to be construed as limiting the scope of the claims in any manner.

DETAILED DESCRIPTION

The following detailed description and appended drawing describe and illustrate various exemplary embodiments of the invention. The description and drawings serve to enable one skilled in the art to make and use the invention, and are not intended to limit the scope of the invention in any manner. In respect of any methods disclosed and illustrated, the steps presented are exemplary in nature, and thus, the order of the steps is not necessary or critical.

Figure 1:
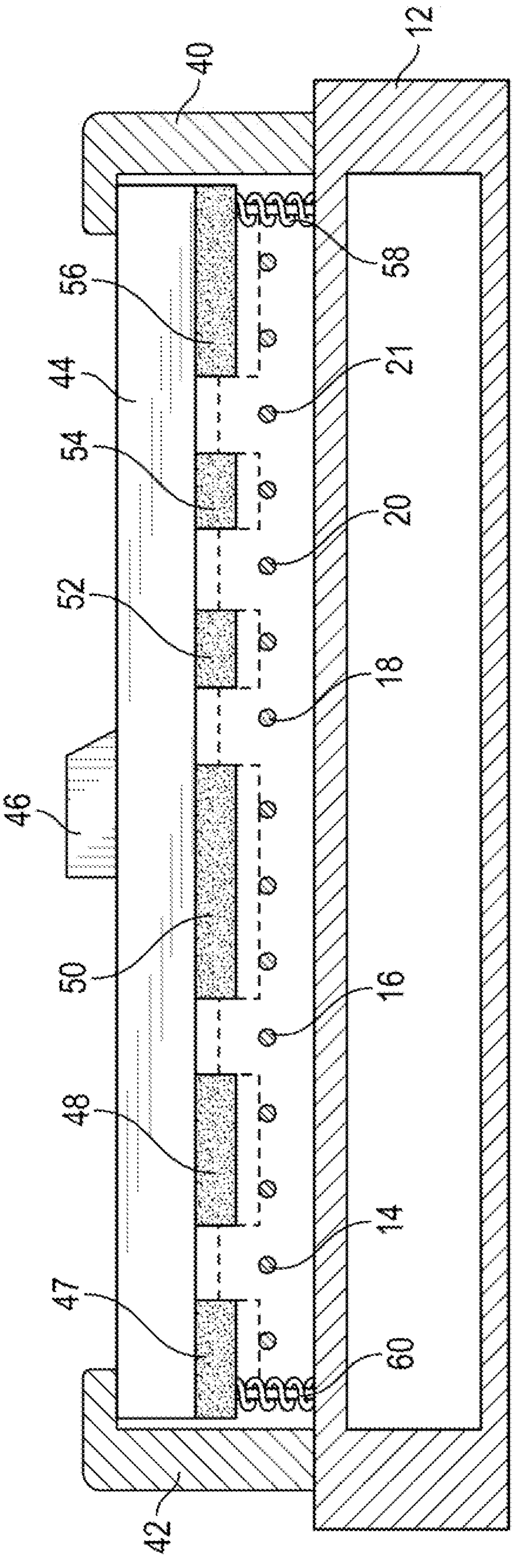
FIG. 1 (Prior Art)
FIGS. 1 and 2 are cross-sectional views of known autoharp damping mechanism, as described herein.

FIG. 1 shows a known autoharp damping mechanism as described in the late 19th century by H. J. Haddon's disclosure of K. A. Gütter's invention. An autoharp 12 is provided with strings, including strings 14, 16, 18, 20, and 21. At least one octave bar 44 is positioned over the strings, and is provided with a piano-like key 46. Spring 58 and 60 hold the at least one octave bar 44 up against holders 40 and 42, so that felts 47, 48, 50, 52, 54, and 56 are not in contact with the strings. When the piano-like key 46 is pressed, the felts 47, 48, 50, 52, 54, and 56 are pressed into contact with the strings other than strings 14, 16, 18, 20, and 21, so that only strings 14, 16, 18, 20, and 21 are allowed to ring freely.

Figure 2:
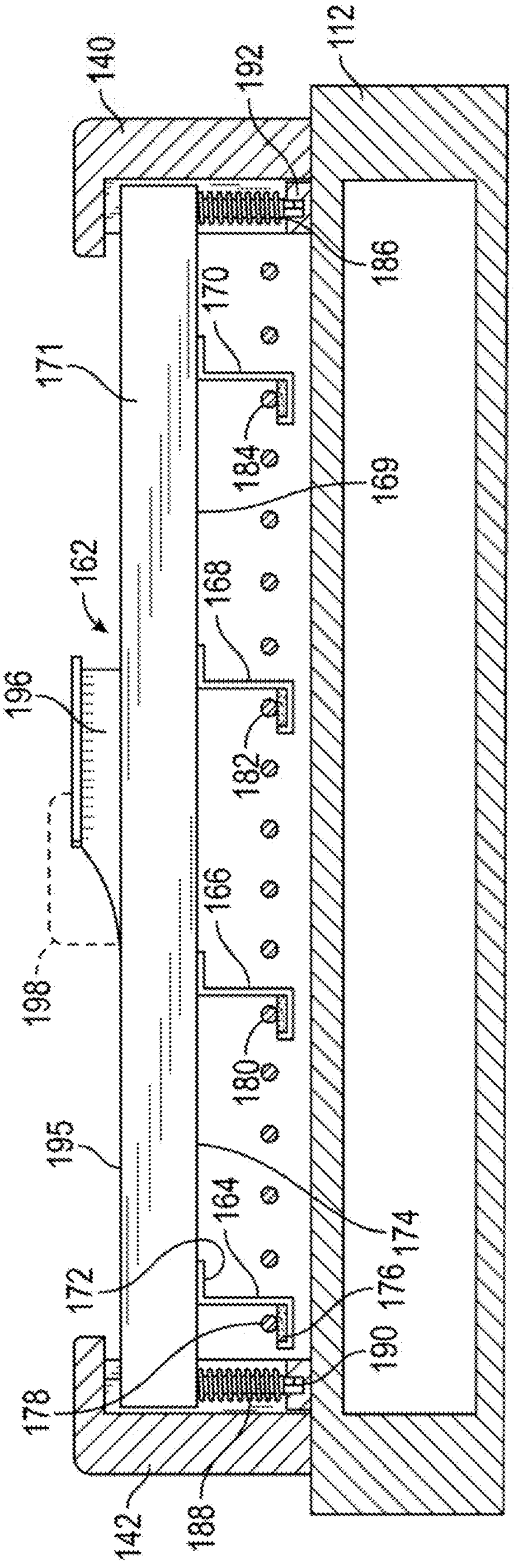
FIG. 2 (Prior Art)

FIG. 2 shows the known autoharp damping mechanism of Newton. Newton's autoharp 112 design includes metal brackets 164, 166, 168, and 170, referred to by Newton as control members, which extend from the octave bar 162 above the strings 178, 180, 182, and 184 to below the strings 178, 180, 182, and 184. The portion of the metal brackets 164, 166, 168, and 170 below the strings 178, 180, 182, and 184 holds the damping material 176, referred to by Newton as damping pads. Springs 186 and 188, referred to by Newton as compression springs, push the octave bar 162 upwards against the holders 140 and 142, referred to by Newton as support members, thereby hold the damping material 176 against the strings 178, 180, 182, and 184. When the piano-like key 196 and 198, referred to by Newton as key portions, is pressed, the octave bar 162 moves downward against stops 190 and 192, thereby releasing the damping material 176 from the strings 178, 180, 182, and 184.

Figure 3:
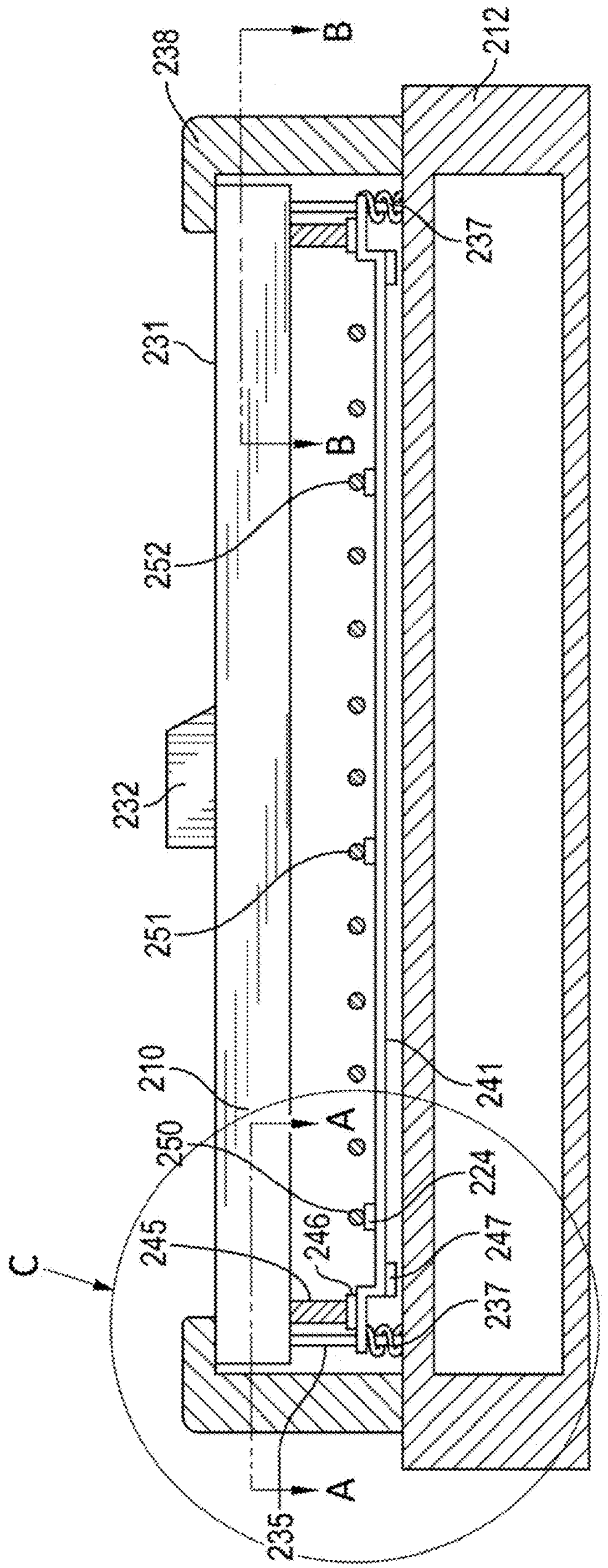
FIG. 3 is a cross-sectional view of an embodiment of the Autoharp Keyboard Mechanism of the present disclosure, as described herein.
Figure 5A:
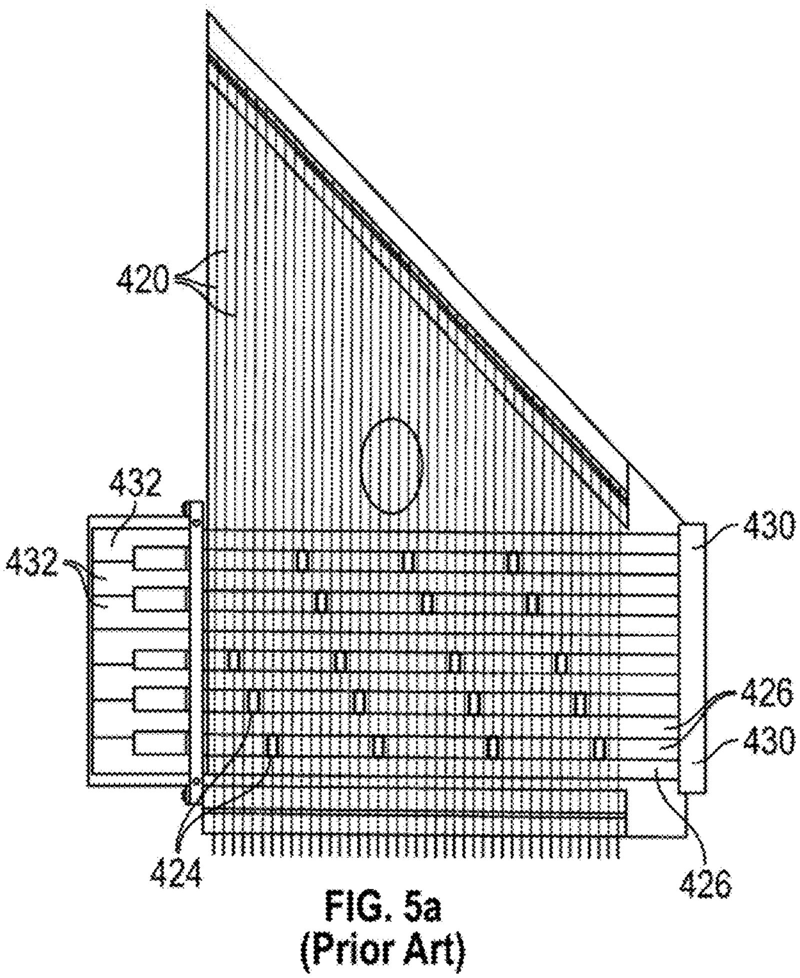
FIG. 5a (Prior Art)
Figure 5B:
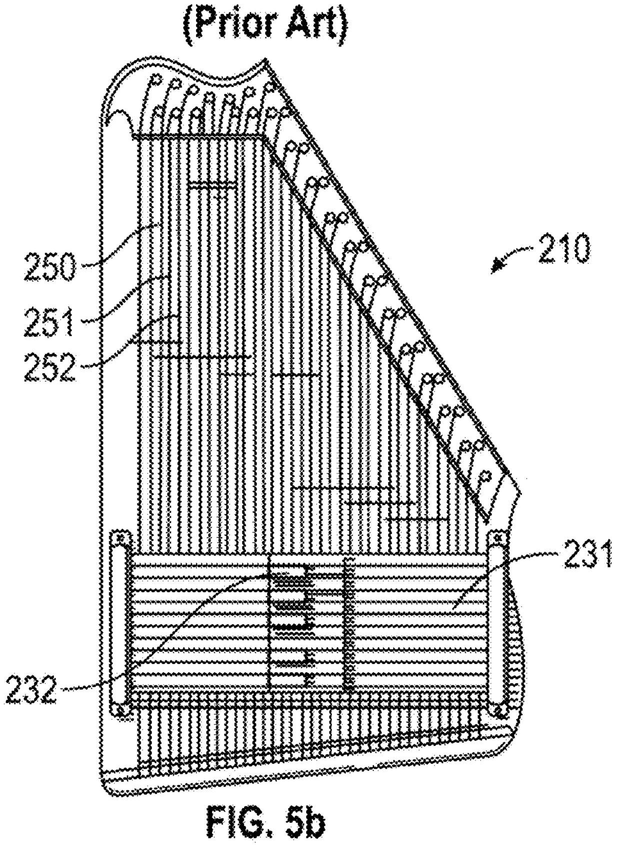

Turning now to FIGS. 3 and 5*b*, an Autoharp Keyboard Mechanism 210 according to the present disclosure is shown. The Autoharp Keyboard Mechanism 210 is fastened to an autoharp box 212 and consists of octave bars 231 to which piano-like keys 232 are attached in place of known chord bar buttons. Other than the piano-like keys 232, the octave bars 231 resemble conventional autoharp chord bars from the top. The octave bars 231 have a hole near one end and a slot near the other. The hole and slot fit over pins 235. In this way, the octave bars 231 ride up and down on the pins 235. A coil spring 237 is placed around each of the pins 235 under the octave bar 231 in order to push the octave bar 231 up. Holders 238 are placed over the ends of the octave bars 231 to keep the octave bars 231 on the pins 235 and to maintain some compression on the coil springs 237.

The Autoharp Keyboard Mechanism 210 according to the present disclosure also includes damping brackets 241, each having a hole and slot at each end. The damping bracket 241 is provided with damping material 224 located underneath the strings 250, 251, and 252 that need to be damped by the damping bracket 241. The damping bracket 241 is placed on the pins 235 over the coil springs 237 and under the strings 250, 251, and 252. The octave bar 231 is also placed on the pins 235 over the strings 250, 251, and 252, and is provided with an adjustable length spacer 245 at each end. The adjustable length spacers 245 have two functions. First, the adjustable length spacers 245 prevent the octave bar 231 from contacting the strings 250, 251, and 252 when the piano-like key 232 is depressed. Second, the adjustable length spacers 245 push the damping brackets 241 down to separate the damping material 224 from the strings 250, 251, and 252 so that the strings 250, 251, and 252 can ring freely.

A preferred embodiment for these adjustable length spacers 245 is a threaded member, such as small wood screws engaged with the octave bars 231. Other embodiments are possible, such as appropriately interference fitted screws and threaded inserts engaged with the octave bars 231. In order to minimize mechanical noise, soft pads 246 may be placed where the adjustable length spacers 245 contact the damping brackets 241. Similarly, soft pads 247 may be placed to prevent direct contact between the damping brackets 241 and the top of the autoharp box 212. These pads may be attached to the adjustable length spacers 245, to the damping brackets 241, and/or to the autoharp box 212.

In the embodiment of the Autoharp Keyboard Mechanism 210 shown in FIG. 3, the adjustable length spacers 245 are positioned adjacent to the pins 235 and inwardly towards the center of the autoharp box 212. It is also contemplated that the adjustable length spacers 245 may be positioned adjacent to the pins 235 and outwardly towards the holders 238. Furthermore, it is contemplated that the adjustable length spacers 245 may be hollow with threads on the exterior, similar to threaded lamp pipe, and may be slidingly positioned over the pins 235. In such an embodiment, appropriate material such as nylon may be used to ensure proper sliding and rattle-free engagement between the adjustable length spacers 245 and the pins 235.

Figure 4A:
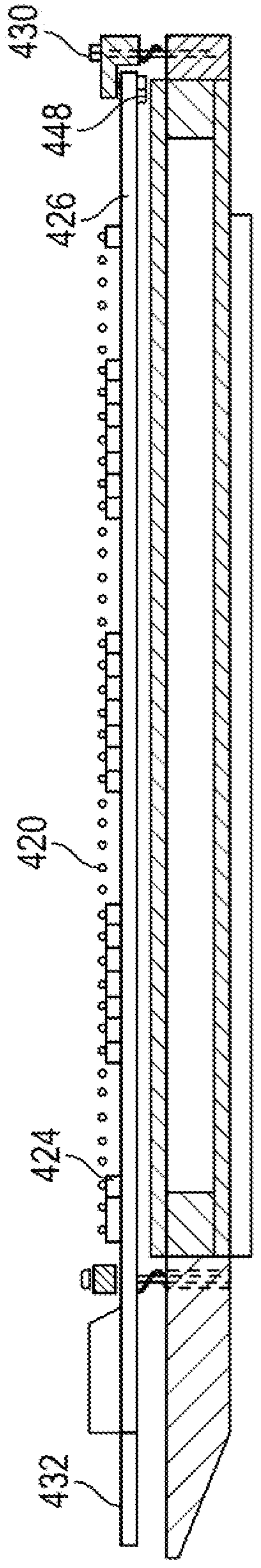
FIG. 4a (Prior Art)
Figure 4B:
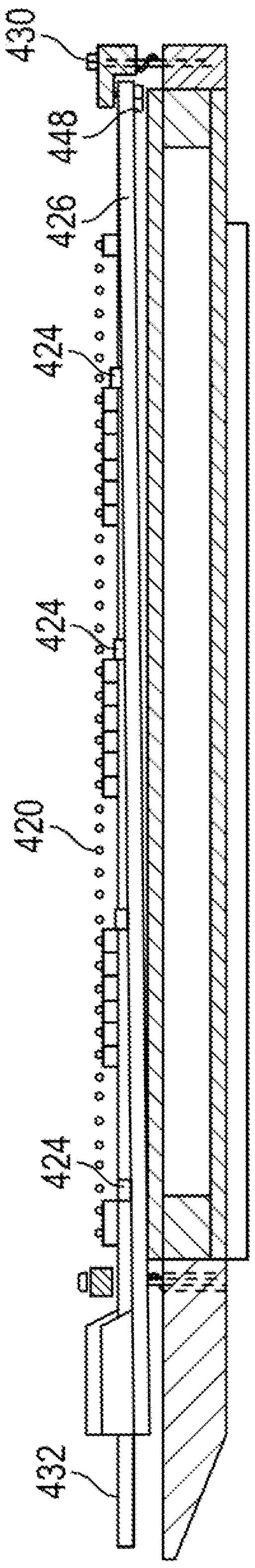
FIG. 4b (Prior Art)

FIGS. 4*a*, 4*b*, and 5*a* show the known autoharp damping mechanism of Aronis. FIG. 4*a* shows a cross-sectional view of the Aronis autoharp damping mechanism when not engaged, whereas FIG. 4*b* shows a cross-sectional view of the Aronis autoharp damping mechanism when engaged. Aronis' autoharp design includes damping brackets 426 with damping pads 424, referred to by Aronis as damper elements, located under the strings 420. The Aronis design has piano-like keys 432 for activating the mechanism on the bass-string side of the autoharp body and rigidly attached to the damping brackets 426. The damping brackets 426 pivot around adjustable mounting elements 430, which effectively in use remain at fixed point on the treble-string side 448, rather than floating free as in the Autoharp Keyboard Mechanism of the present disclosure.

It will be appreciated that a comparison of FIGS. 4*a* and 4*b* shows why the damping bracket 426 pivot point about the adjustable mounting elements 430 must be distant from the right-most string of the autoharp. Specifically, the damping bracket 426 subtends a very small arc about the adjustable mounting element 430, so that the distance that the right-most damping pad 424 travels away from the string 420 nearest the treble-string side 448 is very small. In order to ensure that the right-most damping pad 424 travels sufficiently far away from the string 420 nearest the treble-string side 448, the adjustable mounting element 430 must be as far in the direction of the treble-string side 448 as possible. This is needed so that the strings won't rattle against the damping pads 424 when they vibrate. Therefore, this design causes the resulting autoharp to be very wide, as shown in FIG. 5*a*.

In comparison, FIG. 5*b* shows that the Autoharp Keyboard Mechanism 210 according to the present disclosure does not extend the width of the autoharp. This has several advantages. For non-limiting example, it allows for a more compact and lighter weight autoharp. For further non-limiting example, the Autoharp Keyboard Mechanism 210 according to the present disclosure can be easily retrofitted to a conventional autoharp. For yet further non-limiting example, the Autoharp Keyboard Mechanism 210 according to the present disclosure makes it possible to comfortably play with the autoharp upright on the player's shoulder, which is a preferred playing position for most autoharp players.

Another non-limiting example of an advantage of the Autoharp Keyboard Mechanism 210 according to the present disclosure is that it makes it possible to swap the Autoharp Keyboard Mechanism 210 around so that the piano keys are accessed from the treble-string side of the autoharp box 212 instead of the bass-string side, which may be necessary for playing while holding it on one's shoulder. Attempting to do this with the autoharp damping mechanism of Aronis would require the distance between the outside string and the bracket pivot point to increase significantly, thereby increasing the width of the autoharp even more. Bass strings have larger vibration amplitudes than treble strings and are also a larger diameter, such that they require more clearance. In comparison the Autoharp Keyboard Mechanism 210 according to the present disclosure allows the autoharp to fit into a standard sized case so that a custom case is not required, which would add to the cost.

While the Autoharp Keyboard Mechanism has been described with respect to at least one embodiment, the Autoharp Keyboard Mechanism can be further modified within the spirit and scope of this disclosure, as demonstrated previously. This application is therefore intended to cover any variations, uses, or adaptations of the Autoharp Keyboard Mechanism using its general principles. Further, this application is intended to cover such departures from the present disclosure as come within known or customary practice in the art to which the disclosure pertains and which fall within the limits of the appended claims.

| REFERENCE NUMBER LISTING | |
|---|---|
| FIG. 1 - Known Autoharp Damping Mechanism | |
| 12 | Autoharp |
| 14, 16, 18, 20, 21 | String |
| 40, 42 | Holder |
| 44 | Octave bar |
| 46 | piano-like key |
| 47, 48, 50, 52, 54, 56 | Felt |
| 58, 60 | Spring |
| FIG. 2 - Newton's Autoharp Damping Mechanism | |
| 112 | Autoharp (Resonating box) |
| 140, 142 | Holder (Support members) |
| 162 | Octave bar |
| 164, 166, 168, 170 | Metal bracket (control member) |
| 169 | Bottom side of octave bar |
| 171 | Longitudinal portion of octave bar |
| 172 | Lower portion of control member |
| 174 | Bottom portion of octave bar |
| 176 | Damping material (damping pad) |
| 178, 180, 182, 184 | Strings |
| 186, 188 | Springs (compression springs) |
| 190, 192 | Stops |
| 195 | Top side of octave bar |
| 196, 198 | Piano-like key (key portion) |
| FIG. 3 - Autoharp Keyboard Mechanism of the Present Disclosure | |
| 210 | Autoharp Keyboard Mechanism |
| 212 | Autoharp box |
| 224 | Damping material |
| 231 | Octave bars |
| 232 | Piano-like keys |
| 235 | Pins |
| 237 | Coil springs |
| 238 | Holder |
| 241 | Damping bracket |
| 245 | Adjustable length spacer |
| 246 | Damping pads |
| 247 | Damping pads |
| 250, 251, 252 | Strings |
| FIGS. 4a and 4b - Aronis' Autoharp Damping Mechanism | |
| 420 | Strings |
| 424 | Damping pads (damper elements) |
| 430 | Adjustable mounting elements |
| 426 | Damping brackets |
| 432 | Piano-like key |
| 448 | Treble-string side |

What is claimed is:

1. An Autoharp Keyboard Mechanism of an autoharp having strings, comprising:
   - at least one octave bar having at least one piano-like key;
   - at least two pins extending from a top surface of the autoharp, the at least one octave bar being slidingly engaged with the at least two pins and being located above the strings;
   - at least one damping bracket being slidingly engaged with the at least two pins and being located beneath the at least one octave bar and beneath the strings;
   - at least one coil spring arranged around each of the at least two pins and being located beneath at least one of the octave bar and the damping bracket; and
   - at least two adjustable length spacers engaged with the at least one octave bar and with the at least one damping bracket, at least one adjustable length spacer being located at each end of the at least one octave bar and the at least one damping bracket, the at least two adjustable length spacers further being located between the at least one octave bar and the at least one damping bracket.

2. The Autoharp Keyboard Mechanism of claim 1, further comprising:
   - at least one holder being engaged with the top surface of the autoharp and being configured to retain the at least one octave bar; and
   - each the at least two pins extending from the top surface of the autoharp to a retaining feature of the at least one holder.

3. The Autoharp Keyboard Mechanism of claim 2, wherein:
   - the at least one holder, the at least one octave bar, the at least one damping bracket, and the at least two pins being configured in combination to maintain compression on the coil springs when the at least one octave bar is not being depressed.

4. The Autoharp Keyboard Mechanism of claim 2, wherein:
   - each of the at least one octave bar and the at least one damping bracket being provided with a hole at one end and a slot at another end, each of the hole and the slot being slidingly engaged with one of the at least two pins.

5. The Autoharp Keyboard Mechanism of claim 4, wherein:
   - the at least two adjustable length spacers further comprise threaded members, being in threaded engagement with the at least one octave bar.

6. The Autoharp Keyboard Mechanism of claim 5, wherein:
   - the at least two adjustable length spacers further being at least one of:
     - positioned adjacent to the at least two pins inwardly towards the center of the autoharp,
     - positioned adjacent to the at least two pins outwardly towards the holders, and
     - hollow with threads on the exterior and being slidingly positioned over the at least two pins.

7. The Autoharp Keyboard Mechanism of claim 5, further comprising at least one of:
   - at least one damping pad attached to an upper surface of the at least one damping bracket;
   - at least one damping pad arranged between the at least two adjustable length spacers and the at least one damping bracket; and
   - at least one damping pad arranged between the at least one damping bracket and the top surface of the autoharp.

8. A conversion kit for converting Autoharp Keyboard Mechanisms, comprising:
   - at least one octave bar having at least one piano-like key;
   - at least two pins configured to extend from a top surface of the autoharp, the at least one octave bar being slidingly engageable with the at least two pins and configured to be located above the strings;
   - at least one damping bracket being configured to slidingly engage with the at least two pins and configured to be located beneath the at least one octave bar and beneath the strings;
   - at least one coil spring being configured to be arranged around each of the at least two pins and to be located beneath at least one of the octave bar and the damping bracket; and
   - at least two adjustable length spacers configured to be engaged with the at least one octave bar and with the at least one damping bracket, at least one adjustable length spacer being configured to be located at each end of the at least one octave bar and the at least one damping bracket, the at least two adjustable length spacers further being configured to be located between the at least one octave bar and the at least one damping bracket.

9. The conversion kit of claim 8, wherein:

at least one holder being configured to be engaged with the top surface of the autoharp and being configured to retain the at least one octave bar; and each the at least two pins further being configured to extend from the top surface of the autoharp to a retaining feature of the at least one holder.

10. The conversion kit of claim 9, wherein:

the at least one holder, the at least one octave bar, the at least one damping bracket, and the at least two pins being configured in combination to maintain compression on the coil springs when the at least one octave bar is not being depressed.

11. The conversion kit of claim 9, wherein:

each of the at least one octave bar and the at least one damping bracket being provided with a hole at one end and a slot at another end, each of the hole and the slot being configured to slidingly engage with one of the at least two pins.

12. The conversion kit of claim 11, wherein:

the at least two adjustable length spacers further comprise threaded members, being in threaded engagement with the at least one octave bar.

13. The conversion kit of claim 12, wherein:

the at least two adjustable length spacers further being at least one of:

positioned adjacent to the at least two pins inwardly towards the center of the autoharp, positioned adjacent to the at least two pins outwardly towards the holders, and hollow with threads on the exterior and being slidingly positioned over the at least two pins.

14. The conversion kit of claim 12, further comprising at least one of:

at least one damping pad attached to an upper surface of the at least one damping bracket;

at least one damping pad arranged between the at least two adjustable length spacers and the at least one damping bracket; and at least one damping pad arranged between the at least one damping bracket and the top surface of the autoharp.

15. A method of manufacturing Autoharp Keyboard Mechanisms, comprising the steps of:

providing at least one octave bar having at least one piano-like key;

providing at least two pins extending from a top surface of the autoharp;

slidingly engaging the at least one octave bar with the at least two pins above the strings;

slidingly engaging at least one damping bracket with the at least two pins beneath the at least one octave bar and beneath the strings;

arranging at least one coil spring around each of the at least two pins beneath at least one of the octave bar and the damping bracket; and engaging at least two adjustable length spacers with the at least one octave bar and with the at least one damping bracket between the at least one octave bar and the at least one damping bracket, at least one adjustable length spacer being located at each end of the at least one octave bar and the at least one damping bracket.

16. The method of claim 15, further comprising the steps of:

engaging at least one holder with the top surface of the autoharp and configured the at least one holder to retain the at least one octave bar; and configuring each the at least two pins to extend from the top surface of the autoharp to a retaining feature of the at least one holder.

17. The method of claim 16, further comprising the steps of:

configuring in combination the at least one holder, the at least one octave bar, the at least one damping bracket, and the at least two pins to maintain compression on the coil springs when the at least one octave bar is not being depressed.

18. The method of claim 16, further comprising the steps of:

providing each of the at least one octave bar and the at least one damping bracket with a hole at one end and a slot at another end; and slidingly engaging each of the hole and the slot with one of the at least two pins.

19. The method of claim 18, wherein:

the at least two adjustable length spacers further comprise threaded members, being in threaded engagement with the at least one octave bar.

20. The method of claim 19, wherein:

the at least two adjustable length spacers further being at least one of:

positioned adjacent to the at least two pins inwardly towards the center of the autoharp, positioned adjacent to the at least two pins outwardly towards the holders, and hollow with threads on the exterior and being slidingly positioned over the at least two pins.

* * * * *